(12) United States Patent
Tang et al.

(10) Patent No.: US 11,237,425 B2
(45) Date of Patent: Feb. 1, 2022

(54) DISPLAY PANEL AND DISPLAY DEVICE

(71) Applicant: WUHAN CHINA STAR OPTOELECTRONICS TECHNOLOGY CO., LTD., Hubei (CN)

(72) Inventors: Yuejun Tang, Hubei (CN); Xueyun Li, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 199 days.

(21) Appl. No.: 16/347,848

(22) PCT Filed: Jan. 28, 2019

(86) PCT No.: PCT/CN2019/073458
§ 371 (c)(1),
(2) Date: May 7, 2019

(87) PCT Pub. No.: WO2020/124748
PCT Pub. Date: Jun. 25, 2020

(65) Prior Publication Data
US 2020/0201110 A1 Jun. 25, 2020

(30) Foreign Application Priority Data
Dec. 19, 2018 (CN) .......................... 201811559856.7

(51) Int. Cl.
*G02F 1/1335* (2006.01)
*G02F 1/1333* (2006.01)
*G02F 1/1362* (2006.01)

(52) U.S. Cl.
CPC .. *G02F 1/133512* (2013.01); *G02F 1/133305* (2013.01); *G02F 1/133514* (2013.01); *G02F 1/136286* (2013.01); *G02F 2201/56* (2013.01)

(58) Field of Classification Search
CPC ......... G02F 1/136286; G02F 1/133512; G02F 1/133514; G02F 1/133305;
(Continued)

(56) References Cited

U.S. PATENT DOCUMENTS

2016/0274420 A1* 9/2016 Oh .................... G02F 1/136209
2016/0282664 A1 9/2016 Wu
(Continued)

FOREIGN PATENT DOCUMENTS

| CN | 104375310 A | 2/2015 |
|---|---|---|
| CN | 104614890 A | 5/2015 |

(Continued)

*Primary Examiner* — Thoi V Duong
(74) *Attorney, Agent, or Firm* — Mark M. Friedman

(57) ABSTRACT

A display panel and a display device are provided. The display panel includes a first area, a second area, and a third area. A first distance is greater than or equal to a second distance, and a fourth distance is greater than or equal to a third distance. The first distance, the second distance, the third distance, and the four distance are measured by a length of an orthographic projection on a flexible substrate that a first side and a second side of each of black matrices in the first area and the second area exceed corresponding sides of corresponding data lines, respectively.

8 Claims, 4 Drawing Sheets

(58) Field of Classification Search
CPC ............. G02F 1/136209; G02F 1/1362; G02F 1/1345; G02F 1/1333; G02F 1/1335; G02F 2201/56
See application file for complete search history.

(56) References Cited

U.S. PATENT DOCUMENTS

2018/0341161 A1    11/2018  Lin et al.
2019/0353953 A1*   11/2019  Nieh ..................... G02F 1/1339

FOREIGN PATENT DOCUMENTS

| CN | 105116654 A | 12/2015 |
|----|-------------|---------|
| CN | 107331315 A | 11/2017 |
| CN | 107861286 A | 3/2018  |
| CN | 108132560 A | 6/2018  |
| JP | 2007333818 A | 12/2007 |
| JP | 2009229667 A | 10/2009 |

* cited by examiner

DISPLAY PANEL AND DISPLAY DEVICE

BACKGROUND OF INVENTION

1. Field of Invention

The present invention relates to a technical field of displays, and particularly, to a display panel and a display device.

2. Related Art

Curved liquid crystal panels are a core component of curved liquid crystal display devices. A conventional curved liquid crystal panel 900 is shaped by bending a liquid crystal display panel 900' having a flat structure, as shown in FIG. 1. Specifically, first, the liquid crystal display panel 900' is fabricated. Then, the liquid crystal panel is bent to form the curved liquid crystal panel 900 through a backlight and other mechanical structures. The flat liquid crystal display panel 900' includes a color filter (CF) substrate 910, an array substrate (thin film transistor substrate, TFT substrate) 920, and a liquid crystal layer disposed between the CF substrate 910 and the array substrate 920.

However, because the curved liquid crystal panel 900 has a certain curvature, stresses, movable from left to right, will be generated at portions other than an intermediate portion of the curved liquid crystal panel based on the center of the curved liquid crystal panel, respectively, causing the TFT substrate and the CF substrate to slide relatively. In a left area 901, the CF substrate 910 is displaced to the left with respect the TFT substrate 920, while in the right area 902, the CF substrate 910 is displaced to the right with respect to the TFT substrate 920. Users 30 can see better picture quality of the display panel when watching at a position facing the center of the display panel. However, due to relative displacement of the TFT/CF substrates at the left area and the right area, it is prone to situations such as color shifting/a dark state or light leakage, adversely affecting display performance when users 30 view in a squint position.

Therefore, it is imperative to provide a display panel and a display device to overcome problems of the prior art.

SUMMARY OF INVENTION

An object of the present invention is to provide a display panel and a display device to improve display performance.

To achieve the above-mentioned technical problems, the present invention provides a display panel, an array substrate comprising a flexible substrate, and a plurality of data lines disposed on the flexible substrate; a color filter substrate comprising a plurality of black matrices; and a first area, a second area, and a third area displayed in a top view, the second area disposed between the first area and the third area; each of the first area, the second area, and the third area comprising at least a data line and at least a black matrix; the data line and the black matrix correspondingly disposed, and the black matrix covering a corresponding data line; wherein a first distance is defined between an orthographic projection of a first side of the black matrix in the first area on the flexible substrate and an orthographic projection of a first side of the corresponding data line on the flexible substrate; a second distance is defined between an orthographic projection of a second side of the black matrix in the first area on the flexible substrate and an orthographic projection of a second side of the corresponding data line on the flexible substrate; and the first distance is greater than or equal to the second distance, a difference value between the first distance and the second distance is less than or equal to a first predetermined offset value; a third distance is defined between an orthographic projection of a first side of the black matrix in the third area on the flexible substrate and an orthographic projection of a first side of the data line disposed corresponding to the black matrix in the third area on the flexible substrate; a fourth distance is defined between an orthographic projection of a second side of the black matrix in the third area on the flexible substrate and an orthographic projection of a second side of the data line disposed corresponding to the black matrix in the third area on the flexible substrate; and the fourth distance is greater than or equal to the third distance; and a fifth distance is defined between an orthographic projection of a first side of the black matrix in the second area on the flexible substrate and an orthographic projection of a first side of the data line disposed corresponding to the black matrix in the second area on the flexible substrate; a sixth distance is defined between an orthographic projection of a second side of the black matrix in the second area on the flexible substrate and an orthographic projection of a second side of the data line disposed corresponding to the black matrix in the second area on the flexible substrate; and the fifth distance is equal to the sixth distance.

The present invention provides a display panel, comprising an array substrate comprising a flexible substrate, and a plurality of data lines disposed on the flexible substrate; a color filter substrate comprising a plurality of black matrices; and a first area, a second area, and a third area displayed in a top view, the second area disposed between the first area and the third area; each of the first area, the second area, and the third area comprising at least a data line and at least a black matrix; the data line and the black matrix correspondingly disposed, and the black matrix covering a corresponding data line; wherein a first distance is defined between an orthographic projection of a first side of the black matrix in the first area on the flexible substrate and an orthographic projection of a first side of the corresponding data line on the flexible substrate; a second distance is defined between an orthographic projection of a second side of the black matrix in the first area on the flexible substrate and an orthographic projection of a second side of the corresponding data line on the flexible substrate; and the first distance is greater than or equal to the second distance; and a third distance is defined between an orthographic projection of a first side of the black matrix in the third area on the flexible substrate and an orthographic projection of a first side of the data line disposed corresponding to the black matrix in the third area on the flexible substrate; a fourth distance is defined between an orthographic projection of a second side of the black matrix in the third area on the flexible substrate and an orthographic projection of a second side of the data line disposed corresponding to the black matrix in the third area on the flexible substrate; and the fourth distance is greater than or equal to the third distance.

In the display panel of the present invention, a fifth distance is defined between an orthographic projection of a first side of the black matrix in the second area on the flexible substrate and an orthographic projection of a first side of the data line disposed corresponding to the black matrix in the second area on the flexible substrate; a sixth distance is defined between an orthographic projection of a second side of the black matrix in the second area on the flexible substrate and an orthographic projection of a second side of the data line disposed corresponding to the black matrix in the second area on the flexible substrate; and the fifth distance is equal to the sixth distance.

In the display panel of the present invention, when the first distance is greater than the second distance and the fourth distance is greater than the third distance, the second distance is equal to the third distance, and the third distance is equal to the sixth distance.

In the display panel of the present invention, when the second distance is greater than the sixth distance, the third distance is greater than the sixth distance.

In the display panel of the present invention, each of the first area, the second area, and the third area comprises at least two the data lines and at least two the black matrices, and wherein when the first distance is greater than the second distance, the difference value between the first distance and the second distance is gradually increased from the second area to the first area; and when the fourth distance is greater than the third distance, a difference value between the fourth distance and the third distance is gradually increased from the second area to the third area.

In the display panel of the present invention, a difference value between the first distance and the second distance is less than or equal to a first predetermined offset value, and a difference value between the fourth distance and the third distance is less than or equal to a second predetermined offset value.

In the display panel of the present invention, the difference value between the first distance and the second distance is half of the first predetermined offset value, and the difference value between the fourth distance and the third distance is half of the second predetermined offset value.

In the display panel of the present invention, when the display panel is bent in a first predetermined manner, the first side is defined as a right side, and the second side is defined as a left side.

In the display panel of the present invention, when the display panel is bent in a second predetermined manner, the first side is defined as a left side, and the second side is defined as a right side.

The present invention further provides a display device including any one of the display panels as described above.

The display panel and the display device of the present invention avoid problems such as color shift/light leakage at squint positions arising from displacement of the TFT substrate and the CF substrate by dividing the display panel into multiple areas and increasing the width of a black matrix located opposite to a black matrix at a displaced side at the color filter substrate, thereby improving display performance.

DESCRIPTION OF PREFERRED EMBODIMENTS

The following embodiments are referring to the accompanying drawings for exemplifying specific implementable embodiments of the present invention. Directional terms described by the present invention, such as upper, lower, front, back, left, right, inner, outer, side, etc., are only directions by referring to the accompanying drawings, and thus the used directional terms are used to describe and understand the present invention, but the present invention is not limited thereto.

Figure 1:
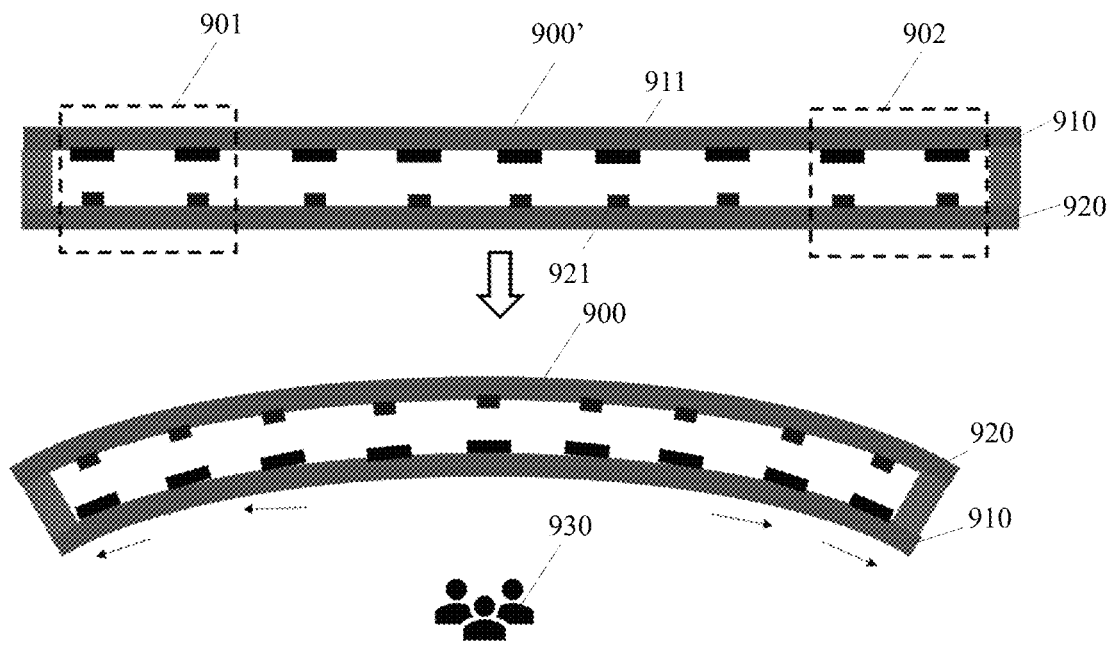
FIG. 1 is a schematic structural view of a conventional display panel.

As shown in FIG. 1, a color filter substrate 910 of an existing flat liquid crystal display (LCD) panel includes a plurality of black matrices 911. An array substrate 920 of the flat LCD panel includes a flexible substrate and data lines 921, a left area 901, a right area 902, and a middle area between the left area 901 and the right area 902. A distance between a projection of a left side of a black matrix 911 in each of the left, right, middle areas on the flexible substrate and a projection of a left side of the corresponding data line 921 on the flexible substrate is the same as a distance between a projection of a right side of the black matrix 911 and a projection of a right side of the corresponding data line 21 on the flexible substrate. That is, a left length difference is a length difference between the projections of the left side of the black matrix 911 and the left side of the corresponding data line 921 on the flexible substrate. A right length difference is a length difference between the projections of the right side of the black matrix 911 and the right side of the corresponding data line 921 on the flexible substrate, wherein the left length difference is the same as the right length difference.

Figure 2:
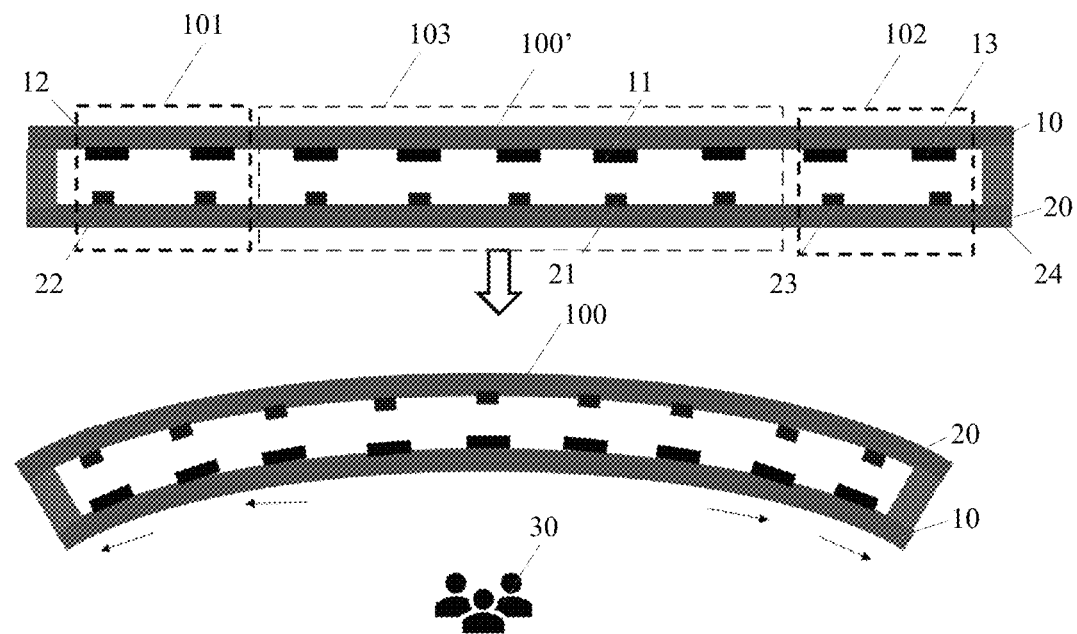
FIG. 2 is a schematic structural view of a display panel of a first embodiment of the present invention.
Figure 3:
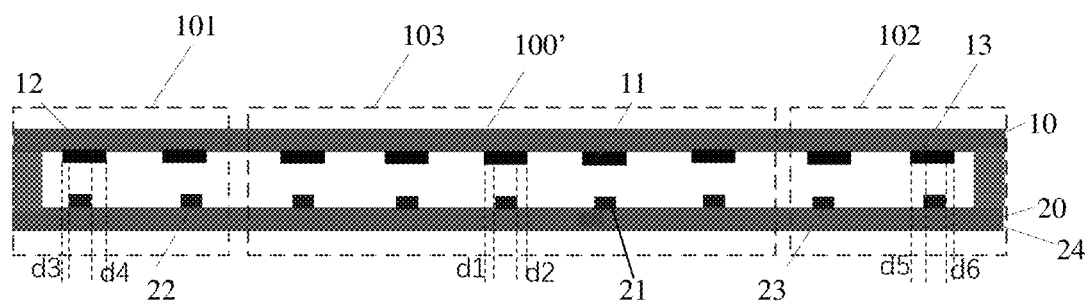
FIG. 3 is a schematic view showing a first structure of the flat display panel of FIG. 2 of the present invention.
Figure 4:
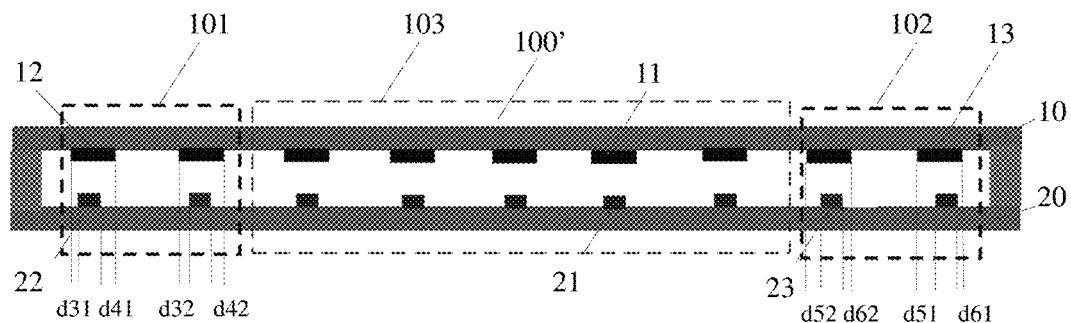
FIG. 4 is a schematic view showing a second structure of the flat display panel of FIG. 2 of the present invention.

Please refer to FIGS. 2 to 4. FIG. 2 is a schematic structural view of a display panel of a first embodiment of the present invention.

As shown in FIG. 2, the display panel of the present invention is a liquid crystal display panel. The display panel mainly includes a color filter substrate 10 and an array substrate 20. The color filter substrate 10 includes another flexible substrate and a plurality of black matrices 11-13 disposed below the flexible substrate. The array substrate 20 includes a flexible substrate 24 and a plurality of data lines 21-23 disposed on the flexible substrate 24. The plurality of data lines 21-23 are corresponding to locations of the black matrices. The array substrate 20 further includes a plurality of scan lines.

The display panel includes a first area 101, a second area 103, and a third area 102 as displayed in a top view. The second area 103 is disposed between the first area 101 and the third area 102. That is, for example, the first area 101 is a left side area, the second area 103 is a middle area, and the third area 102 is a right side area. The first area 101 includes two data lines 22 and two black matrices 12. The second area 103 includes four data lines 21 and four black matrices 11. The third area 102 includes two data lines 23 and two black matrices 13. It can be understood that each of the first area 101, the second area 103, and the third area 102 may include a data line and a black matrix, or more than two data lines and black matrices, wherein a number of the data lines is the same as a number of the black matrices. Taking the first area 101 as an example. The leftmost data line 22 is corresponding to the leftmost black matrix 12, and the black matrix 12 covers the data line 22. Likewise, the data lines and the black matrices in the second and third areas 102 and 103 are configured in a way same as that of the first area 101.

Referring to FIG. 3 in combination, a first distance d4 is defined between an orthographic projection of a first side (a right side) of the black matrix 12 in the first area 101 on the flexible substrate 24 and an orthographic projection of a first side of the corresponding data line 22 on the flexible substrate 24. A second distance d3 is defined between an orthographic projection of a second side (a left side) of the black matrix 12 in the first area 101 on the flexible substrate 24 and an orthographic projection of a second side of the corresponding data line 22 on the flexible substrate 24.

Referring to FIG. 4 in combination, a first distance d41 is defined as a length that a right side of the leftmost black matrix 12 in the first area 101 exceeds a right side of the leftmost data line 22. A first distance d42 is defined as a length that the right side of the second black matrix 12 counted from left to right exceeds the right side of the second data line 22 counted from left to right.

A second distance d31 is defined as a left side of the leftmost black matrix 12 in the first area 101 exceeds a left side of the leftmost data line 22, wherein the first distance d41 is greater than the second distance d31. A second distance d32 is defined as the left side of the second black matrix 12 counted from left to right exceeds the left side of the second data line 22 counted form left to right, wherein the second distance d31 is greater than the second distance d32.

A difference value between the first distance d4 and the second distance d3 is gradually increased from the second area 103 to the first area 101. That is, the difference value between the first distance d4 and the second distance d3 is increased in sequence from the middle to the left. In one embodiment, a difference value between d41 and d31 is greater than a difference value between d42 and d32. A left area may include more than two data lines and more than two black matrices. Taking a left area including four data lines and four black matrices as an example. A length that a right side of each of the black matrices from left to right exceeds a right side of the corresponding data line is defined as the first distance d41, d42, d43, and d44, and a length that the left side of each of the black matrices from left to right exceeds the left side of the corresponding data line is defined as the second distance d31, d32, d33, and d34. Specifically, a formula is met as follows: d41−d31>d42−d32>d43−d33>d44−d34.

Referring back to FIG. 2, in order to improve display performance, the difference value between the first distance d4 and the second distance d3 is less than or equal to a first predetermined offset value $d_L$. The first predetermined offset value $d_L$ is the maximum offset value measured between a side of the black matrix in the left area and a corresponding side of the data line of a display panel manufactured by an existing method. The difference value between the first distance d4 and the second distance d3 is less than or equal to the first predetermined offset value $d_L$. For example, both the difference value between d41 and d31 and the difference value between d42 and d32 are less than or equal to $d_L$. When the left area includes more than two data lines and more than two black matrices, a difference value between the first distance and the second distance of each of the data lines and the black matrices is less than or equal to $d_L$.

The difference value between the first distance d4 and the second distance d3 is half of the first offset value $d_L$. For example, the difference value between d41 and d31 is half of $d_L$, and the difference value between d42 and d32 is half of $d_L$.

Please refer to FIGS. 3 and 4 in combination. A third distance d6 is defined between an orthographic projection of a first side (a right side) of the black matrix 13 in the third area 102 on the flexible substrate 24 and an orthographic projection of a first side of the data line 23 disposed corresponding to the black matrix 13 on the flexible substrate 24. A fourth distance d5 is defined between an orthographic projection of a second side (a left side) of the black matrix 13 in the third area 102 on the flexible substrate 24 and an orthographic projection of a second side of the data line 23 disposed corresponding to the black matrix 13 on the flexible substrate 24.

A third distance d61 is defined as a length that a right side of the rightmost black matrix 13 exceeds a right side of the rightmost data line 23. A third distance d62 is defined as a length that the right side of the second black matrix 13 counted from right to left exceeds the right side of the second data line 23 counted from right to left.

A fourth distance d51 is defined as a length that a left side of the rightmost black matrix 13 exceeds a left side of the rightmost data line 23. A fourth distance d52 is defined as a length that the left side of the second black matrix 13 counted from right to left exceeds the left side of the second data line 23 counted from right to left, wherein d51 is greater than d61, and d52 is greater than d62.

When the fourth distance d5 is greater than the third distance d6, a difference value between the fourth distance d5 and the third distance d6 is gradually increased from the second area 103 to the third area 102. For example, the difference value between the fourth distance d5 and the third distance d6 is increased gradually from the middle to the right.

It can be understood that the right area may include more than two data lines and more than two black matrices. Taking the right area including four data lines and four black matrices as an example. The length that the right side of each of the black matrices from right to left exceeds the right side of the corresponding data line is defined as the first distance d61 and d62 and a first distance d63 and d64, and the length that the left side of each of the black matrices from right to left exceeds the left side of the corresponding data line is defined as the second distance d51 and d52 and a second distance d53 and d54. Specifically, a formula is met as follows: d51−d61>d52−d62>d53−d63>d54−d64.

In one embodiment, a difference value between d51 and d61 is greater than a difference value between d52 and d62.

A difference value between the fourth distance d5 and the third distance d6 is less than or equal to a second predetermined offset value $d_R$. The second predetermined offset value $d_R$ is the maximum offset value measured between a side of the black matrix in the right area and a corresponding side of the data line of the display panel manufactured by the existing method. The difference value between the fourth distance d5 and the third distance d6 is less than or equal to the second predetermined offset value $d_R$. For example, both the difference value between d51 and d61 and the difference value between d52 and d62 are less than or equal to $d_R$. When the right area includes more than two data lines and more than two black matrices, the difference value between the fourth distance and the third distance of each of the data lines and the black matrices is less than or equal to $d_R$.

The difference value between the fourth distance d5 and the third distance d6 is half of the second offset value $d_R$. For example, the difference value between d51 and d61 is half of $d_R$, and the difference value between d52 and d62 is half of $d_R$.

Please refer back to FIG. 3. A fifth distance d2 is defined between an orthographic projection of a first side (a right side) of the black matrix 11 in the second area 103 on the flexible substrate 24 and an orthographic projection of a first side of the data line 21 disposed corresponding to the black matrix 11 on the flexible substrate 24. A sixth distance d1 is defined between an orthographic projection of a second side (a left side) of the black matrix 11 in the second area 103 on the flexible substrate 24 and an orthographic projection of a second side of the data line 21 disposed corresponding to the black matrix 11 on the flexible substrate 24. The fifth distance d2 is equal to the sixth distance d1.

In one embodiment, in order to improve display performance, the second distance d3 is greater than the sixth distance d1, and the third distance d6 is greater than the sixth distance d1.

Figure 5:
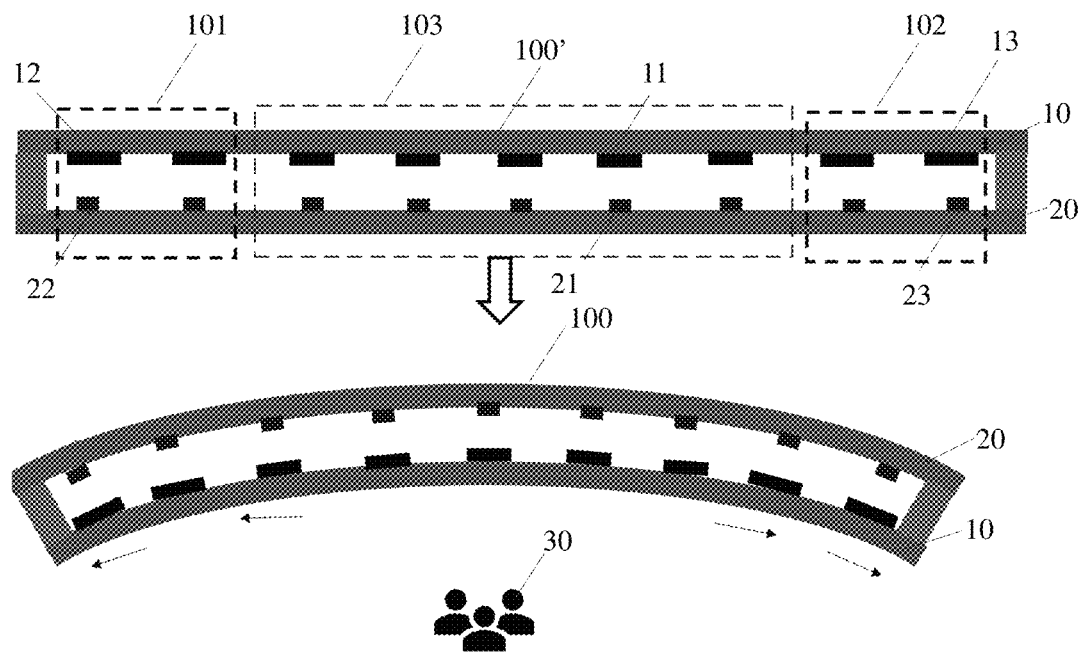
FIG. 5 is a schematic structural view of a display panel of a second embodiment of the present invention.
Figure 6:
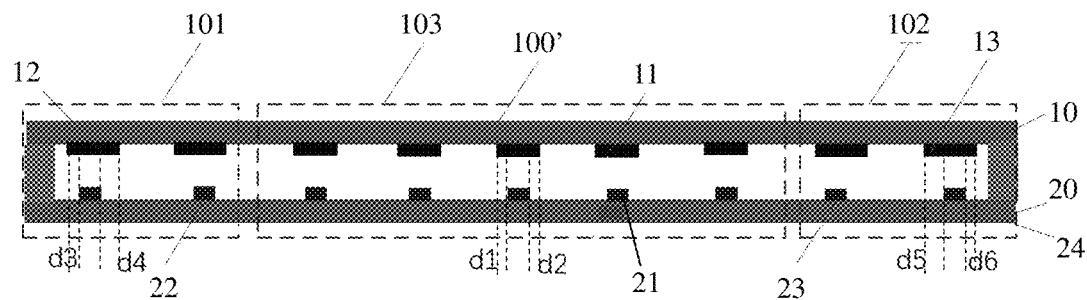
FIG. 6 is a schematic structural view of the flat display panel of FIG. 5 of the present invention.

Please refer to FIGS. 5 and 6. FIG. 5 is a schematic structural view of a display panel of a second embodiment of the present invention.

In this embodiment, as shown in FIGS. 5 and 6, differences between this embodiment and the previous embodiment are as follows: the second distance d3 is equal to the third distance d6, and the third distance d6 is equal to the sixth distance d1.

Figure 7:
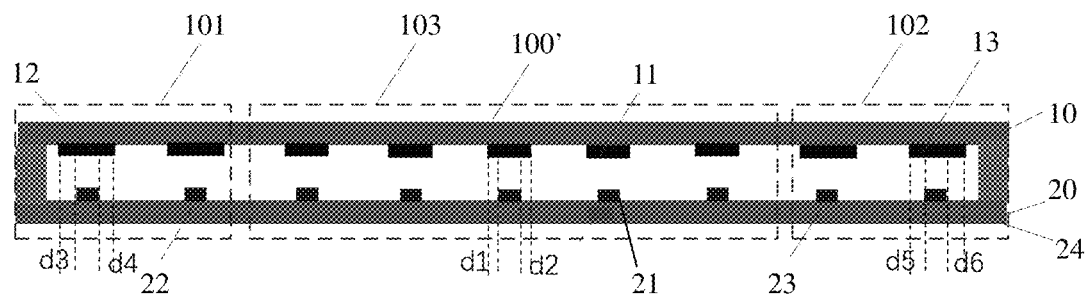
FIG. 7 is a schematic structural view of a display panel of a third embodiment of the present invention.

Please refer to FIG. 7. FIG. 7 is a schematic structural view of a display panel of a third embodiment of the present invention.

In this embodiment, as shown in FIGS. 5 and 6, differences between this embodiment and the first embodiment are as follows: the first distance d4 is equal to the second distance d3, and the fourth distance d5 is equal to the third distance d6. A curved display panel of this embodiment has a structure same as that of FIG. 5.

It can be understood that, in the above embodiments, in particular, an increase of a width of the black matrix in the second and third embodiments may give rise to a decrease in an aperture ratio of the left area and the right area to some extent. As a result, backlight brightness can be selected to increase at both the left area and the right area. For example, when a direct-lit backlight module is employed, backlight brightness can be increased by increasing a number of light emitting diode (LED) lights at both ends of the left area and the right area, or by other means, such as changing a layout of dots on a light guiding plate.

As shown in FIGS. 2 to 7, when the display panel is bent in a first predetermined manner, the first side is defined as the right side, and the second side is defined as the left side. For example, when being bent in a manner shown in FIG. 2, the array substrate 20 being bent is located at an outer arc (larger radius) of the curved display panel, and the color filter substrate 10 is located at an inner arc (smaller radius) of the curved display panel.

Figure 8:
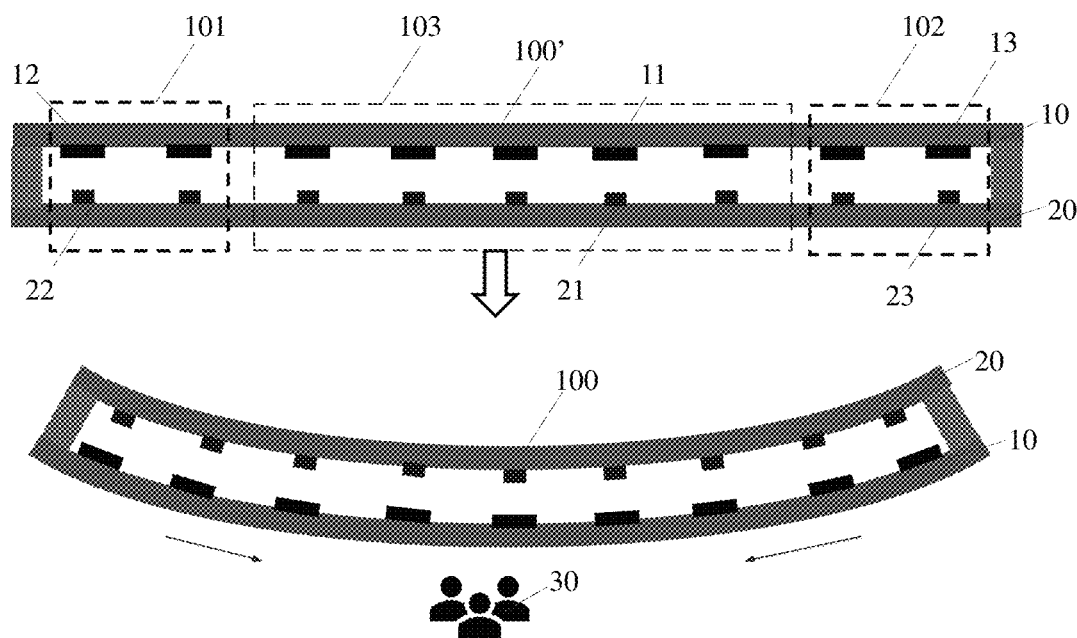
FIG. 8 is a schematic structural view of a display panel of a fourth embodiment of the present invention.

In another embodiment, as shown in FIG. 8, when the display panel is bent in a second predetermined manner, the first side is defined as the left side, and the second side is defined as the right side. For example, when being bent in a manner shown in FIG. 8, the array substrate 20 being bent is located at an inner arc (smaller radius) of the curved display panel, and the color filter substrate 10 is located at an outer arc (larger radius) of the curved display panel. In this manner, in the left area 101, the CF substrate 10 is displaced to the right with respect to the TFT substrate 20, while in the right area 102, the CF substrate 10 is displaced to the left with respect to the TFT substrate 20.

Under the premise that the width of the black matrices is subject to change in different areas configured in a flat display panel, when the flat display panel is bent to form a curved display panel, color shift/light leakage at squint positions caused by displacement of TFT/CF substrates can be prevented by blocking light leakage through pre-compensating displacement configuration and/or increased portions of the black matrices. When the color filter substrate and the array substrate of the curved display panel are disposed with respect to each other, color shift/light leakage caused by displacement of upper and lower substrates of the curved display panel can be blocked by widened black matrices without adding additional masks, thereby to improve display performance of a curved liquid crystal display panel.

The present invention further provides a display device including any one of the display panels as described above.

The display panel and the display device of the present invention avoid problems such as color shift/light leakage at squint positions arising from displacement of the TFT substrate and the CF substrate by dividing the display panel into multiple areas and increasing the width of a black matrix located opposite to a black matrix at a displaced side at the color filter substrate, thereby improving display performance.

Accordingly, although the present invention has been disclosed as a preferred embodiment, it is not intended to limit the present invention. Those skilled in the art without departing from the scope of the present invention may make various changes or modifications, and thus the scope of the present invention should be after the appended claims and their equivalents.

What is claimed is:

1. A display panel, comprising:
   an array substrate comprising a flexible substrate, and a plurality of data lines disposed on the flexible substrate;
   a color filter substrate comprising a plurality of black matrices; and
   a first area, a second area, and a third area displayed in a top view, and the second area disposed between the first area and the third area;
   wherein the plurality of data lines comprise at least two data lines in each of the first area, the second area, and the third area;
   the plurality of black matrices comprise at least two black matrices in each of the first area, the second area, and the third area; and
   each of the data lines and each of the black matrices are correspondingly disposed, such that each one of the data lines and a corresponding one of the black matrices are collectively defined as a set of the data line and the black matrix in each of the first area, the second area, and the third area, and the black matrix covers the corresponding data line;
   wherein a first distance is defined between an orthographic projection of a first side of each of the black matrices in the first area on the flexible substrate and an orthographic projection of a first side of the corresponding data line on the flexible substrate; a second distance is defined between an orthographic projection of a second side of each of the black matrices in the first area on the flexible substrate and an orthographic projection of a second side of the corresponding data line on the flexible substrate; and the first distance is greater than or equal to the second distance, a difference value between the first distance and the second distance is less than or equal to a first predetermined offset value;
   a third distance is defined between an orthographic projection of a first side of each of the black matrices in the third area on the flexible substrate and an orthographic projection of a first side of the data line disposed corresponding to the black matrix in the third area on the flexible substrate; a fourth distance is defined between an orthographic projection of a second side of each of the black matrices in the third area on the flexible substrate and an orthographic projection of a second side of the data line disposed corresponding to the black matrix in the third area on the flexible substrate; and the fourth distance is greater than or equal to the third distance; and a fifth distance is defined between an orthographic projection of a first side of each of the black matrices in the second area on the flexible substrate and an orthographic projection of a first side of the data line disposed corresponding to the black matrix in the second area on the flexible substrate; a sixth distance is defined between an orthographic projection of a second side of each of the black matrices in the second area on the flexible substrate and an orthographic projection of a second side of the data line disposed corresponding to the black matrix in the second area on the flexible substrate; and the fifth distance is equal to the sixth distance;

wherein the second distance is greater than the sixth distance and the third distance is greater than the sixth distance;

wherein based on the first distance being greater than the second distance, the difference value between the first distance and the second distance of each of the sets of the data lines and the black matrices increases in a direction from the second area to the first area;

wherein based on the fourth distance being greater than the third distance, a difference value between the fourth distance and the third distance of each of the sets of the data lines and the black matrices increases in a direction from the second area to the third area.

2. The display panel of claim 1, wherein the difference value between the fourth distance and the third distance is less than or equal to a second predetermined offset value.

3. The display panel of claim 2, wherein the difference value between the first distance and the second distance is half of the first predetermined offset value, and the difference value between the fourth distance and the third distance is half of the second predetermined offset value.

4. A display device, comprising a display panel, and the display panel comprising:
an array substrate comprising a flexible substrate, and a plurality of data lines disposed on the flexible substrate;
a color filter substrate comprising a plurality of black matrices; and
a first area, a second area, and a third area displayed in a top view, and the second area disposed between the first area and the third area;
wherein the plurality of data lines comprise at least two data lines in each of the first area, the second area, and the third area;
the plurality of black matrices comprise at least two black matrices in each of the first area, the second area, and the third area, wherein each of the black matrices has a same width in each of the first area, the second area, and the third area; and
each of the data lines and each of the black matrices are correspondingly disposed, such that each of the data lines and a corresponding one of the black matrices are collectively defined as a set of the data line and the black matrix in each of the first area, the second area, and the third area, and the black matrix covers the corresponding data line;

wherein a first distance is defined between an orthographic projection of a first side of each of the black matrices in the first area on the flexible substrate and an orthographic projection of a first side of the corresponding data line on the flexible substrate; a second distance is defined between an orthographic projection of a second side of each of the black matrices in the first area on the flexible substrate and an orthographic projection of a second side of the corresponding data line on the flexible substrate; and the first distance is greater than or equal to the second distance; and a third distance is defined between an orthographic projection of a first side of each of the black matrices in the third area on the flexible substrate and an orthographic projection of a first side of the data line disposed corresponding to the black matrix in the third area on the flexible substrate; a fourth distance is defined between an orthographic projection of a second side of each of the black matrices in the third area on the flexible substrate and an orthographic projection of a second side of the data line disposed corresponding to the black matrix in the third area on the flexible substrate; and the fourth distance is greater than or equal to the third distance;

wherein based on the first distance being greater than the second distance, the difference value between the first distance and the second distance of each of the sets of the data lines and the black matrices increases in a direction from the second area to the first area;

wherein based on the fourth distance being greater than the third distance, a difference value between the fourth distance and the third distance of each of the sets of the data lines and the black matrices increases in a direction from the second area to the third area.

5. The display device of claim 4, wherein a fifth distance is defined between an orthographic projection of a first side of each of the black matrices in the second area on the flexible substrate and an orthographic projection of a first side of the data line disposed corresponding to the black matrix in the second area on the flexible substrate; a sixth distance is defined between an orthographic projection of a second side of each of the black matrices in the second area on the flexible substrate and an orthographic projection of a second side of the data line disposed corresponding to the black matrix in the second area on the flexible substrate; and the fifth distance is equal to the sixth distance.

6. The display device of claim 4, wherein based on the first distance being greater than the second distance and the fourth distance being greater than the third distance, the second distance is equal to the third distance, and the third distance is equal to the sixth distance.

7. A display device, comprising:
an array substrate comprising a flexible substrate, and a plurality of data lines disposed on the flexible substrate;
a color filter substrate comprising a plurality of black matrices; and
a first area, a second area, and a third area displayed in a top view, and the second area disposed between the first area and the third area;
wherein the plurality of data lines comprise at least two data lines in each of the first area, the second area, and the third area;
the plurality of black matrices comprise at least two black matrices in each of the first area, the second area, and the third area, wherein each of the black matrices has a same width in each of the first area, the second area, and the third area; and each of the data lines and each of the black matrices are correspondingly disposed, such that each one of the data lines and a corresponding one of the black matrices are collectively defined as a set of the data line and the black matrix in each of the first area, the second area, and the third area, and the black matrix covers the corresponding data line;

wherein a first distance is defined between an orthographic projection of a first side of each of the black matrices in the first area on the flexible substrate and an orthographic projection of a first side of the corresponding data line on the flexible substrate; a second distance is defined between an orthographic projection of a second side of each of the black matrices in the first area on the flexible substrate and an orthographic projection of a second side of the corresponding data line on the flexible substrate; and the first distance is greater than or equal to the second distance, a difference value between the first distance and the second distance is less than or equal to a first predetermined offset value;

a third distance is defined between an orthographic projection of a first side of each of the black matrices in the third area on the flexible substrate and an orthographic projection of a first side of the data line disposed corresponding to the black matrix in the third area on the flexible substrate; a fourth distance is defined between an orthographic projection of a second side of each of the black matrices in the third area on the flexible substrate and an orthographic projection of a second side of the data line disposed corresponding to the black matrix in the third area on the flexible substrate; and the fourth distance is greater than or equal to the third distance; and a fifth distance is defined between an orthographic projection of a first side of each of the black matrices in the second area on the flexible substrate and an orthographic projection of a first side of the data line disposed corresponding to the black matrix in the second area on the flexible substrate; a sixth distance is defined between an orthographic projection of a second side of each of the black matrices in the second area on the flexible substrate and an orthographic projection of a second side of the data line disposed corresponding to the black matrix in the second area on the flexible substrate; and the fifth distance is equal to the sixth distance;

wherein based on the first distance being greater than the second distance, the difference value between the first distance and the second distance of each of the sets of the data lines and the black matrices increases in a direction from the second area to the first area;

wherein based on the fourth distance being greater than the third distance, a difference value between the fourth distance and the third distance of each of the sets of the data lines and the black matrices increases in a direction from the second area to the third area.

8. The display panel of claim 7, wherein the difference value between the fourth distance and the third distance is less than or equal to a second predetermined offset value.

* * * * *